June 1, 1965 C. BRICOUT 3,186,161
DEVICE TO CONTROL THE RATE OF SUPERCHARGING INTERNAL COMBUSTION ENGINES
Filed Sept. 10, 1963 2 Sheets-Sheet 1
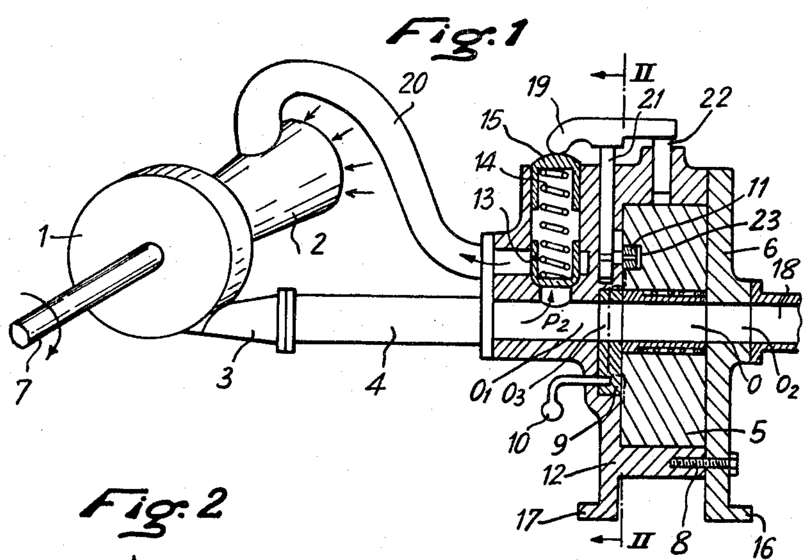
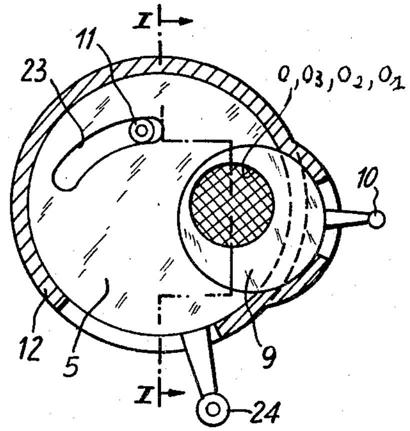
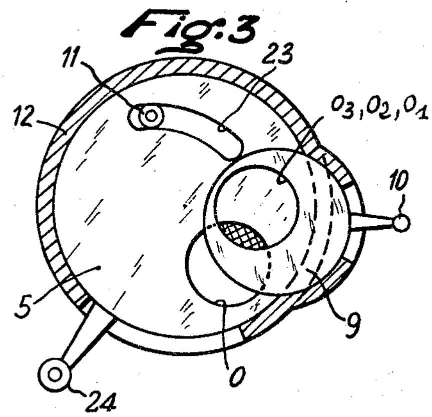
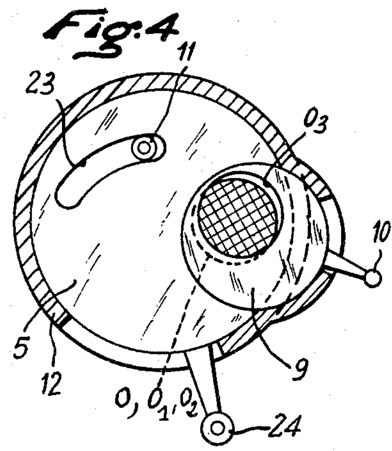
Constant Bricout
By: Edwin E. Greigg
ATTORNEY

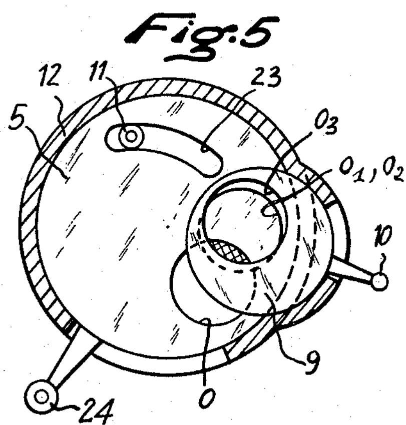
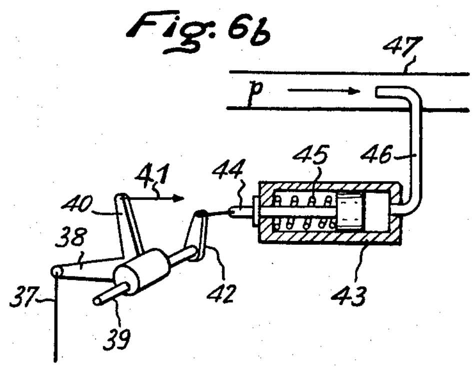
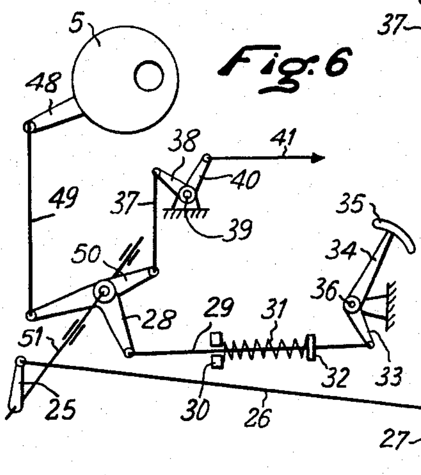
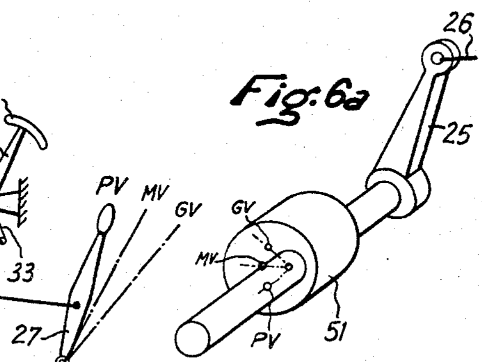
Constant Bricout
by: Edwin E. Greigg
ATTORNEY 3,186,161
Patented June 1, 1965

3,186,161

DEVICE TO CONTROL THE RATE OF SUPERCHARGING INTERNAL COMBUSTION ENGINES

Constant Bricout, Paris, France, assignor to Les Applications Techniques Industrielles L.A.T.I., Paris, France, a corporation of France Filed Sept. 10, 1963, Ser. No. 308,006
Claims priority, application France, Sept. 10, 1962, 908,988; Aug. 20, 1963, 945,095
5 Claims. (Cl. 60—13)

Supercharging of internal combustion engines is achieved by compressing the air before its admission into the cylinders. This compression is obtained either by a turbo compressor actuated by the kinetic energy of the exhaust gas or by a compressor driven by some mechanical means, such as, the engine or the like.

The control of the rate of supercharging, in other words, the control of the delivered working pressure of the compressor is carried out conventionally by varying the rotation thereof by means affecting its driving mechanism. Such means are, for example, by varying the speed of the compressor mechanism or in the case of a turbo compressor, by controlling the bypass of the exhaust gas upstream of the turbine. Another way to control the rate of supercharging is to operate a butterfly valve or a gate valve which may be disposed in the pressure conduit of the compressing apparatus.

Such control devices, however, are unsatisfactory since they cause a pulsating output. In order to obviate this phenomenon it has been proposed to dispose a check valve upstream of the gating device. The discharge opening of this valve may be directed towards the intake of the compressor. If such a valve is provided with a resilient closing means of constant tension, it will open practically fully beyond the necessary opening pressure. This causes a drop of the pressure upstream of the gate.

This invention relates to an improved means for efficient supercharging, especially at low speeds and in particular concerns a compressor for the supercharging of internal combustion engines, comprising, on the one hand a variable gating device controlling the pressure and on the other hand, disposed upstream thereof, a check valve provided with resilient closing means. The tension of the resilient closing means is made dependent upon the position of the gate.

The device according to the invention makes it possible to obtain a defined pressure for a pre-selected output; in other words it makes possible to define a working pressure output, and thus, a rate of supercharging for each position of the gating body.

It may also be noted that a closed position of the gating device results in an undercharging at high speed.

Calculations and practice have shown that it is advantageous to use different rates of supercharging for each speed, that is for each gear reduction. The rate of supercharging decreases with the increase of the rotational speed and follows the laws differing respectively for each gear, particularly at low speeds. It is thus important to be able to vary the gate opening for one given quantity of carburant, in other words, in case of a traction engine, for the same position of the accelerator; thereby defining several starting positions and laws of variation for the various cycles of combustion.

Also, it is important to re-use as large a portion as possible of the energy released by the check valve.

Further, according to the invention, the gating device disposed in the pressure conduit of the compressor is provided with a complementary structure for varying the output of the compressor. This complementary structure is actuated in such a manner as to permit the changing of the aperture of the gating device in each of its predetermined positions.

Also, according to the invention the stream discharged by the check valve disposed upstream of the gating device is directed towards the intake of the gas turbine driving the compressor.

This latter arrangement makes it possible to save one portion of the energy released through the check valve by lowering the temperature of the exhaust gases at the intake of the turbine.

An exemplary embodiment of this invention is shown in the drawing wherein:

FIGURE 1 is an axial section along I—I of FIGURE 2 of a gating device according to the invention together with an isometric representation of the compressor and its intake and output conduits;

FIGURE 2 is a section along II—II of FIGURE 1;

FIGURE 3 is the same view as FIGURE 2 with the rotary body in a different position;

FIGURES 4 and 5 are similar to FIGURES 2 and 3 showing the complementary structure in a different position;

FIGURE 6 is a schematic illustration of the principle of controlling the gating device in a traction engine;

FIGURES 6*a* and 6*b* illustrate details of FIGURE 6.

Referring now to FIGURE 1 compressor 1 driven by shaft 7 comprises an intake nozzle 2 and an output nozzle 3 which delivers compressed air to the engine through collectors 4 and 18. Between collectors 4 and 18 there is interposed a gating device which comprises on the one hand a rotary body 5 disposed in a housing having two plates 6 and 12 held together by means of an annular array of bolts such as that depicted at 8, and having integral mounting brackets 16 and 17, and on the other hand a complementary gate consisting of a disc 9 pivotally mounted in plate 12 and actuated by lever 10. Plate 12 is provided with an orifice O1 aligned with orifice O2 of plate 6, whereas rotary body 5 is provided with an orifice O and the complementary gate 9 has an orifice O3. The four orifices O, O1, O2 and O3 are all eccentrically disposed. Orifices O1 and O2 are fixed while O and O3 are movable independently with respect to each other. A valve 13 is disposed in radial arrangement in an integral portion offset relative to plate 12 and is urged against its seat by spring 14 tensioned by cap 15. Cap 15 is actuated by clamp 19, radially and slidably mounted in plate 12 by means of stems 21 and 22. The position of stems 21 and 22 is controlled by displacing head 11, fixedly attached to stem 21, in slot 23 of the rotary body 5.

If the output pressure $P_2$ increases valve 13 opens, discharging a fraction of the pressurized air which, by means of collector 20, is directed into the intake nozzle 2 of the compressor 1 until the original value $P_2$ is re-established. The value $P_2$, however, varies as a function of the tension of spring 14, or, in other words as a function of the angular position of rotary body 5.

In FIGURES 2 and 3 the position of the complementary gate 9 is such that the pressure output is at its maximum for a given position of the rotary body 5. In such a case orifices O1 and O3 are in alignment. In FIGURE 2 there is shown a position of full pressure output; lever 24 actuating the rotary body 5 is in one of its extreme positions, the four orifices O, O1, O2 and O3 are in alignment and the area of the actual passage (cross hatched in the figure) is at its fully open or maximum position. Also, head 11 is at its least eccentric extreme position and adjacent to one end of the arcuate slot 23 and consequently clamp 19 (FIGURE 1) compresses spring 14 to a maximum extent by means of cap 15. Thus pressure $P_2$ is at its maximum. In FIGURE 3 orifices O1, O2 and O3 are still aligned but, since lever 24 has now been moved to its other extreme position traversing thru the arcuate slot 23 about head 11, the orifice O is then out of alignment thus reducing the actual area of the passage. This results in a low output. At this time, the head 11 has now assumed its most extreme eccentric position: the tension of spring 14 is at its minimum and so is pressure $P_2$ at the entrance of valve 13.

FIGURES 4 and 5 illustrate the device with rotary body 5 in the same extreme positions as in FIGURES 2 and 3, respectively, except that the complementary gate 9 is in its maximum closed position to which it is moved by means of lever 10. In FIGURE 4, where the rotary body 5 is shown at its maximum open position, the area of the passage is reduced with respect to FIGURE 2; thus the output is reduced, whereas head 11 determines a pressure $P_2$ at the valve entrance identical to that in FIGURE 2. In FIGURE 5 both the principal gate and the complementary gate are substantially fully closed. The area of passage is very small and consequently the output assumes a value much lower than in the case of FIGURE 3.

Referring now to FIGURE 6 the gating device of the invention shown here is mounted in a traction engine. The angular position of rotary body 5 is controlled by means of lever 48 and bar 49. Lever 50 mounted on shaft 51 is actuated by a lever 25 which on the other hand is actuated by a connecting bar 26 pivotally attached to lever 27 associated with the gear box. Lever 50 is also actuated by bellcrank 28 to one end of which there is attached a bar 29 which passes through stationary block 30. A spring 31 is interposed between block 30 and a collar 32 fixedly attached to bar 29. The other end of bar 29 is attached to lever 33 and arranged to pivot about the fulcrum point 36 and is actuated by lever 34 carrying an accelerating pedal 35. By means of bar 37, lever 50 actuates the bellcrank comprising arms 38 and 40 which are arranged to pivot about stationary base point 39. Bar 41, attached to arm 40 controls the admission of fuel to the motor.

The lever 27 previously referred to as being associated with the gear box, defines as many positions for lever 50 as there are speeds, for example in the case of a three speed transmission box where there would be three positions indicated graphically as PV, MV and GV. Lever 27 also actuates lever 10 of the complementary gate 9 by means of a simple linkage mechanism (not shown in FIGURE 6) so that to each position of gear shift lever 27 there corresponds one particular position of gate 9.

In FIGURE 6*a* there is shown a detail of shaft 51 which has an eccentric portion in order to define an initial control of the combustion cycle for each position of lever 27.

In FIGURE 6*b* there is shown a detail of shaft 39 which is also eccentric and adapted to assume different positions as a function, for example, of pressure $p$ in collector 47 which corresponds in structure, function and location to collector 18 of FIG. 1. A tube 46 communicating with collector 47 is attached to a cylinder 43 in which there is slidably mounted a piston 44 biased by a spring 45 against the gas pressure. During operation, an equilibrium is established between pressure $p$ and spring 45 by a displacement of piston 44. The motion of piston 44 varies the position of rod 41 and thus controls the admission of fuel. As seen, rod 41 is also connected with rod 37, the position of which depends on the lever 34 and the accelerator 35.

Although but two embodiments of the invention have been depicted and described, it will be apparent that these embodiments are illustrative in nature and that a number of modifications in the apparatus and variations in its end use may be effected without departing from the spirit or scope of the invention as defined in the appended claims.

I claim:

1. A device for controlling the output flow from a compressor for supercharging internal combustion engines comprising, conduit means for delivering pressurized fluid from said compressor to said engine, gating means disposed in said conduit means for controlling the fluid flow therein, valve means disposed in said conduit means upstream of said gating means and adapted to be moved independently therefrom solely by said pressurized fluid to release part thereof from said conduit means, resilient means for normally urging said valve means into a closed position and tensioning means actuated by said gating means for varying the force exerted by said resilient means against said valve means.

2. A device according to claim 1 including complementary means associated with said gating means for controlling said fluid flow in addition to and independently of said gating means.

3. A device for controlling the output flow from a compressor for supercharging internal combustion engines comprising, conduit means for delivering pressurized fluid from said compressor to said engine, a housing having in alignment an eccentric inlet orifice and an outlet orifice both attached to said conduit means, a gating body disposed in said housing and axially rotatable therein, said body provided with an eccentric orifice adapted to variably obstruct the flow of said pressurized fluid between said outlet and inlet orifices as said body is caused to assume a plurality of positions, a complementary gate rotatably mounted in said housing and having an orifice of substantially the same area and eccentricity as said orifice in said gating body, said orifice in said complementary gate being adapted to block said orifice in said gating body to a variable extent as said complementary gate is caused to assume a plurality of positions, valve means disposed in said housing upstream of said gating body and adapted to release part of said pressurized fluid, resilient means for normally maintaining said valve means in a closed position and tensioning means responsive to the position of said gating body by varying the force exerted by said resilient means against said valve means.

4. A device according to claim 3 wherein said tensioning means includes a stem slidably mounted in said housing and connected to said rotary body, said stem adapted to be displaced linearly as said body is caused to rotate.

5. A device for controlling the output flow from a compressor for supercharging internal combustion engines comprising, conduit means for delivering pressurized fluid from said compressor to said engine, a housing having in alignment an eccentric inlet orifice and an outlet orifice in opposite walls thereof, an axially rotatable body disposed in said housing and provided with an eccentric orifice adapted to assume a plurality of positions for controlling the flow between said aligned orifices, valve means disposed in said conduit means upstream of said body and adapted to release part of the pressurized fluid from said conduit means, resilient means for normally urging said valve means into a closed position and tensioning means actuated by said body for varying the force exerted by said resilient means against said valve means.

References Cited by the Examiner

UNITED STATES PATENTS

| | | | |
|---|---|---|---|
| 2,067,757 | 1/37 | Fielden | 123—119 |
| 2,636,341 | 4/53 | Buchi | 60—13 |
| 2,654,991 | 10/53 | Nettel | 60—13 |
| 2,813,672 | 11/57 | Long et al. | 230—22 |

RICHARD B. WILKINSON, *Primary Examiner.*

KARL J. ALBRECHT, *Examiner.*